(12) United States Patent
Kawabe et al.

(10) Patent No.: US 8,056,912 B2
(45) Date of Patent: Nov. 15, 2011

(54) MULTI-LINK SUSPENSION DEVICE AND METHOD FOR SUSPENDING WHEELS

(75) Inventors: Yoshihiro Kawabe, Kamakura (JP); Masahiko Nishida, Hiratsuka (JP); Isao Watanabe, Ebina (JP); Kenji Sagara, Isehara (JP); Kazuo Kondo, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 119 days.

(21) Appl. No.: 12/517,285

(22) PCT Filed: Mar. 17, 2008

(86) PCT No.: PCT/IB2008/000726
§ 371 (c)(1),
(2), (4) Date: Jun. 2, 2009

(87) PCT Pub. No.: WO2008/120069
PCT Pub. Date: Oct. 9, 2008

(65) Prior Publication Data
US 2010/0078911 A1   Apr. 1, 2010

(30) Foreign Application Priority Data

Mar. 29, 2007 (JP) .................................. 2007-087745
Apr. 27, 2007 (JP) .................................. 2007-119885

(51) Int. Cl.
*B60G 3/18* (2006.01)
(52) U.S. Cl. .... 280/124.135; 280/124.144; 280/124.136
(58) Field of Classification Search ............ 280/124.134–124.136, 124.138, 280/124.143, 124.144
See application file for complete search history.

(56) References Cited

U.S. PATENT DOCUMENTS

| | | | | |
|---|---|---|---|---|
| 3,893,701 | A * | 7/1975 | Kroniger | 280/124.131 |
| 4,537,420 | A * | 8/1985 | Ito et al. | 280/86.75 |
| 4,621,830 | A * | 11/1986 | Kanai | 280/124.144 |
| 4,681,342 | A | 7/1987 | Goerich | |
| 4,744,587 | A * | 5/1988 | Veneau | 280/124.15 |
| 4,765,647 | A * | 8/1988 | Kondo et al. | 280/124.128 |
| 4,772,043 | A | 9/1988 | Muramatsu | |
| 4,822,010 | A * | 4/1989 | Thorn | 267/140.12 |
| 4,921,265 | A * | 5/1990 | Eyb et al. | 280/638 |
| 5,380,024 | A * | 1/1995 | Hayami | 280/124.143 |
| 5,607,177 | A * | 3/1997 | Kato | 280/124.134 |
| 5,895,063 | A * | 4/1999 | Hasshi et al. | 280/124.134 |
| 6,099,005 | A * | 8/2000 | Wakatsuki | 280/124.135 |
| 6,302,420 | B1 * | 10/2001 | Sano | 280/124.134 |
| 7,510,199 | B2 * | 3/2009 | Nash et al. | 280/124.135 |
| 7,549,657 | B2 * | 6/2009 | Jargowsky et al. | 280/124.128 |
| 7,703,782 | B2 * | 4/2010 | Kiselis et al. | 280/124.133 |

(Continued)

FOREIGN PATENT DOCUMENTS

DE   4224484 A1 *  1/1994

(Continued)

*Primary Examiner* — Paul N Dickson
*Assistant Examiner* — Nicole Verley
(74) *Attorney, Agent, or Firm* — Young Basile (57) ABSTRACT

A wheel suspension device for a vehicle includes a wheel supporting member rotatably supporting a wheel. The wheel supporting member is linked to a vehicle-body side by a first link and a second link, with the second link arranged substantially parallel to the first link in a vehicle width direction. The first link has a projecting portion, and at least one elastic linking portion links the projecting portion to the second link.

20 Claims, 10 Drawing Sheets

U.S. PATENT DOCUMENTS

| | | | |
|---|---|---|---|
| 7,753,384 B2* | 7/2010 | Kunze et al. | 280/124.116 |
| 7,784,806 B2* | 8/2010 | Schmidt et al. | 280/124.134 |
| 7,789,406 B2* | 9/2010 | Matsuoka | 280/124.135 |
| 7,798,506 B2* | 9/2010 | LeBlanc et al. | 280/124.135 |
| 7,832,750 B2* | 11/2010 | Gerrard | 280/124.134 |
| 7,845,663 B2* | 12/2010 | Gerrard | 280/124.134 |
| 2001/0022437 A1* | 9/2001 | Suzuki | 280/124.134 |
| 2002/0005621 A1* | 1/2002 | Christophliemke et al. | 280/124.134 |
| 2004/0135337 A1* | 7/2004 | Alesso et al. | 280/124.134 |
| 2005/0140110 A1* | 6/2005 | Lee et al. | 280/124.109 |
| 2006/0151970 A1* | 7/2006 | Kaminski et al. | 280/124.134 |
| 2006/0220330 A1* | 10/2006 | Urquidi et al. | 280/5.516 |
| 2007/0257463 A1* | 11/2007 | Sanville et al. | 280/124.134 |
| 2007/0267838 A1* | 11/2007 | Sanville et al. | 280/124.134 |

FOREIGN PATENT DOCUMENTS

| | | |
|---|---|---|
| JP | 61-247504 | 11/1986 |
| JP | 62-234705 | 10/1987 |
| JP | 62289409 A * | 12/1987 |
| JP | 05-201217 | 8/1993 |

* cited by examiner

MULTI-LINK SUSPENSION DEVICE AND METHOD FOR SUSPENDING WHEELS

STATEMENT OF RELATED CASES

This application claims priority from Japanese Patent Application Serial No. 2007-087745, filed Mar. 29, 2007 and No. 2007-119885, filed Apr. 27, 2007, each of which is incorporated herein in its entirety by reference.

TECHNICAL FIELD

The present invention relates to a suspension device for wheels used in a vehicle.

BACKGROUND

A suspension device for rear wheels is discussed in, for example, Japanese Unexamined Patent Application Publication No. 62-234705. That device comprises a pair of rigid arms and a linking member. The pair of rigid arms links a vehicle-body side member and a lower area of a wheel supporting member, and the arms are disposed apart from each other in a vehicle forward-backward direction. The linking member is provided between the pair of rigid arms and is rigidly linked to the pair of rigid arms. The linking member is formed of flat steel extending in the vehicle forward-backward direction and is deformable in a direction parallel to a plane including a linking portion that links the vehicle-body side member and the wheel supporting member.

Accordingly, a forward-backward rigidity supporting the wheels is reduced, and a toe characteristic during the reduction is made proper.

BRIEF SUMMARY

The invention provides a suspension device and method for suspending wheels. According to one example taught here, a suspension device includes a wheel supporting member configured to rotatably support a wheel. A first link has a projecting portion, and the first link connects the wheel supporting member to a vehicle-body side. A second link also connects the wheel supporting member to the vehicle-body side, and the second link is arranged substantially parallel to the first link in a vehicle width direction. At least one elastic linking portion links the projecting portion to the second link.

In another example, a suspension device for suspending a wheel supporting member that rotatably supports a wheel includes first linking means for linking for linking the wheel supporting member and a vehicle-body side member to each other. Second linking means are disposed behind the first linking means in a vehicle forward-backward direction, and the second linking means also linking the wheel supporting member and the vehicle-body side member to each other. Elastic linking means elastically link the first linking means and second linking means to each other and also permit the first linking means and second linking means to be relatively displaced.

In another example, a method of suspending a wheel supporting member includes displacing two links relative to one another in accordance with a displacement of the wheel supporting member in the vehicle forward-backward direction, the two links arranged substantially parallel in a vehicle width direction and linking the wheel supporting member with a vehicle-body side member. The method in this example also includes generating an elastic force in accordance with the relative displacement.

These, and other examples of the inventive suspension devices and methods, are described in detail herein.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Wheels are required to be displaced by a certain amount in consideration of, for example, ride quality. However, if the amount of displacement is too large, problems occur. Therefore, it is necessary to restrict large displacements. However, in the related technology, since there is nothing that restricts the amount of flexing and deformation of the linking member, means for restricting a forward-backward displacement needs to be separately provided.

In recognition of this problem, embodiments of a suspension device as recited in the claims will now be described with reference to the drawings.

Embodiments of the suspension device as recited in the claims make it is possible to restrict a large displacement of wheels while reducing a forward-backward rigidity that supports the wheels.

Figure 1:
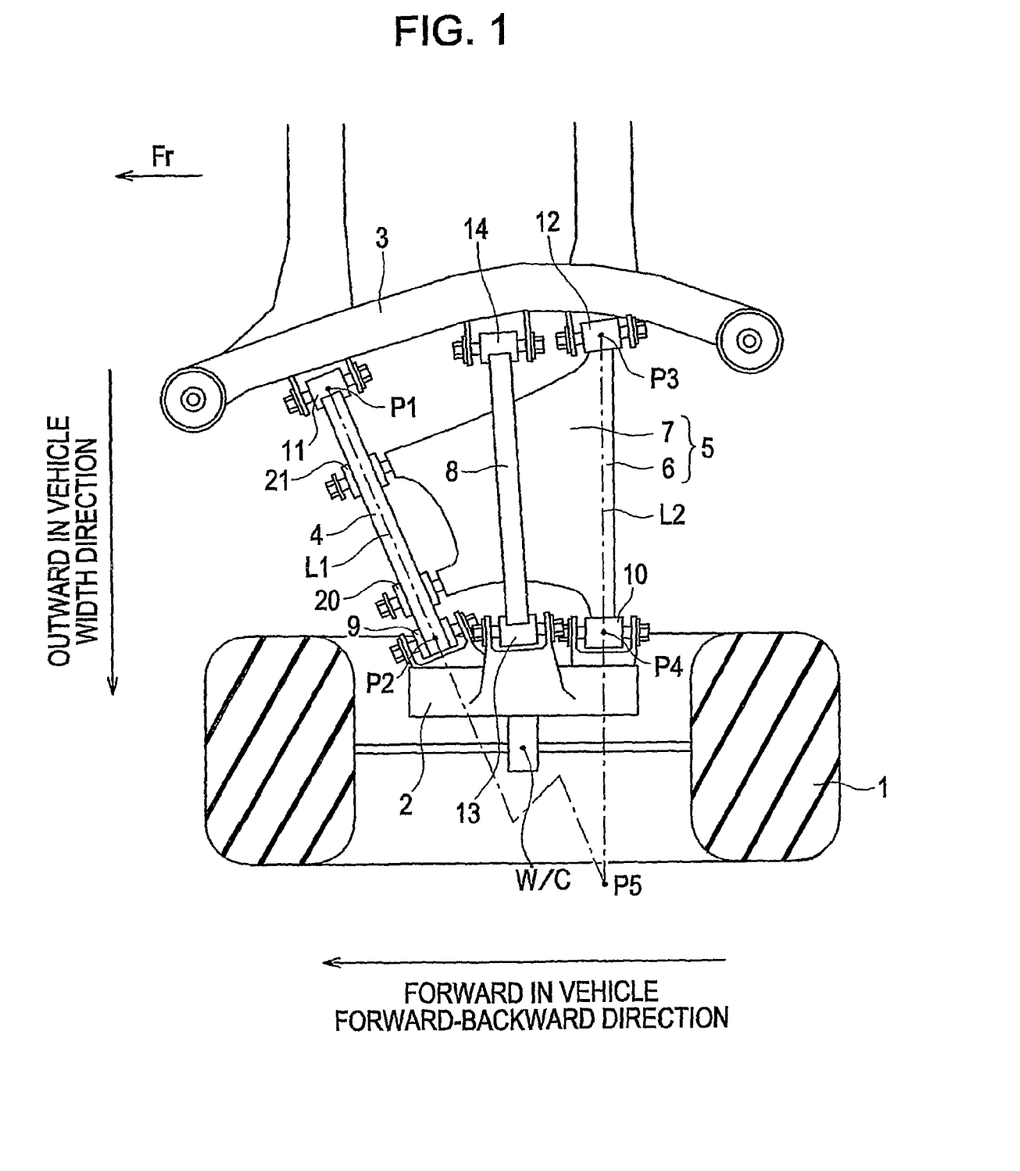
FIG. 1 is a top view of a suspension device for rear wheels according to a first embodiment of the invention.
Figure 2:
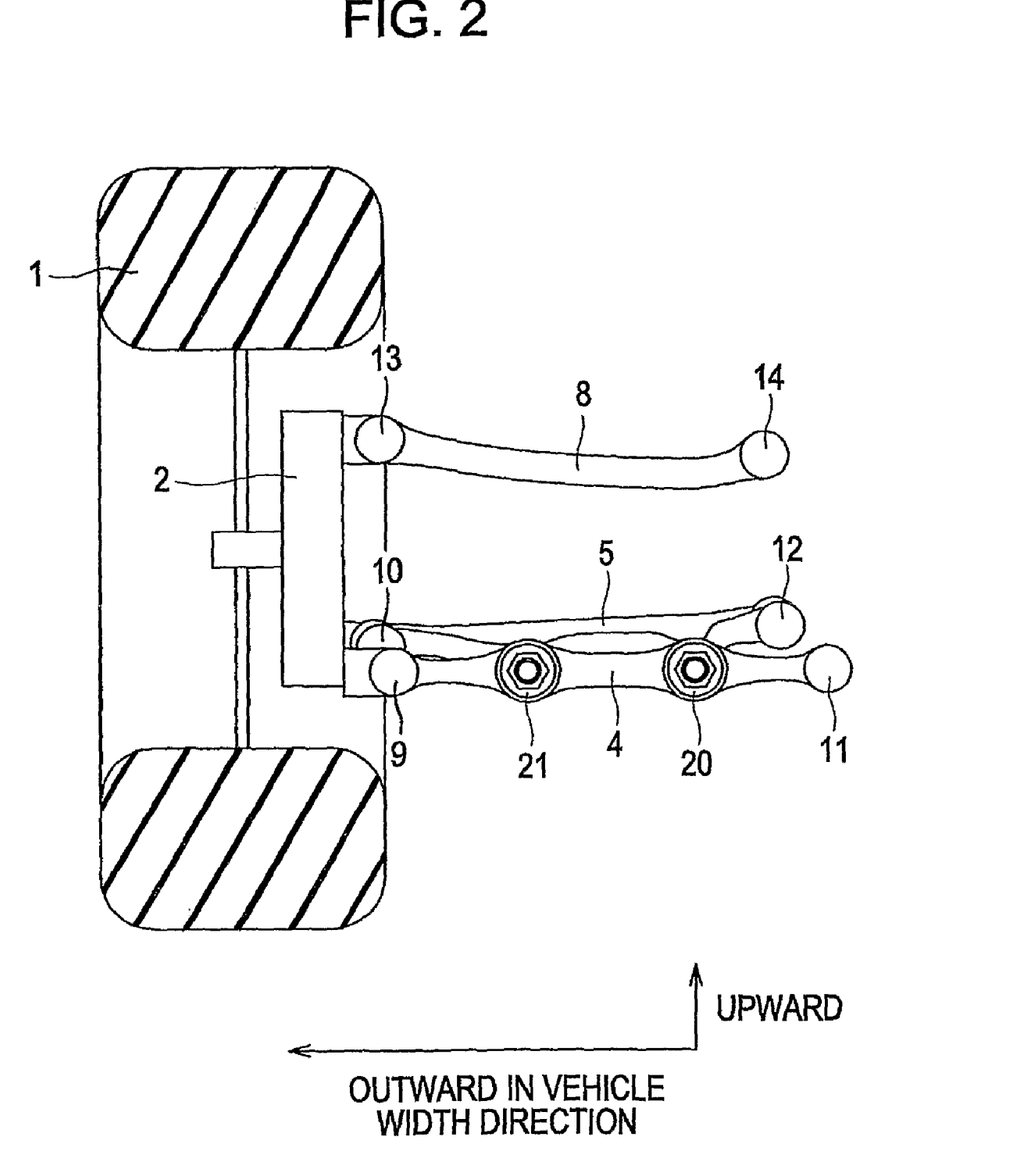
FIG. 2 is a side view, as seen from the front of a vehicle, of a disposition and structure of links in the suspension device for rear wheels according to the first embodiment.

As shown in FIGS. 1 and 2, a suspension device according to an embodiment of the invention comprises two lower links 4 and 5 and an upper link 8. The lower links 4 and 5 link a lower area of an axle 2, which rotatably supports a wheel 1, and a suspension member 3, which is a vehicle-body side member. The upper link 8 links an upper area of the axle 2 and the suspension member 3.

The two lower links 4 and 5 are mounted to the axle 2 by a bush 9 and a bush 10, respectively, so as to be swingable vertically. The two lower links 4 and 5 are linked to the suspension member 3 through a bush 11 and a bush 12, respectively, so as to be swingable vertically. The upper link 8 is mounted to the axle 2 by one bush 13 so as to be swingable vertically and is linked to the suspension member 3 by one bush 14 so as to be swingable vertically.

The two lower links 4 and 5 are disposed substantially in parallel in a vehicle width direction. Here, when the two lower links 4 and 5 are to be distinguished in the description, the lower link 4 at the front side in the vehicle forward-backward direction will be called the "front lower link 4," and the lower link 5 at the rear side in the vehicle forward-backward direction will be called the "rear lower link 5."

Figure 3:
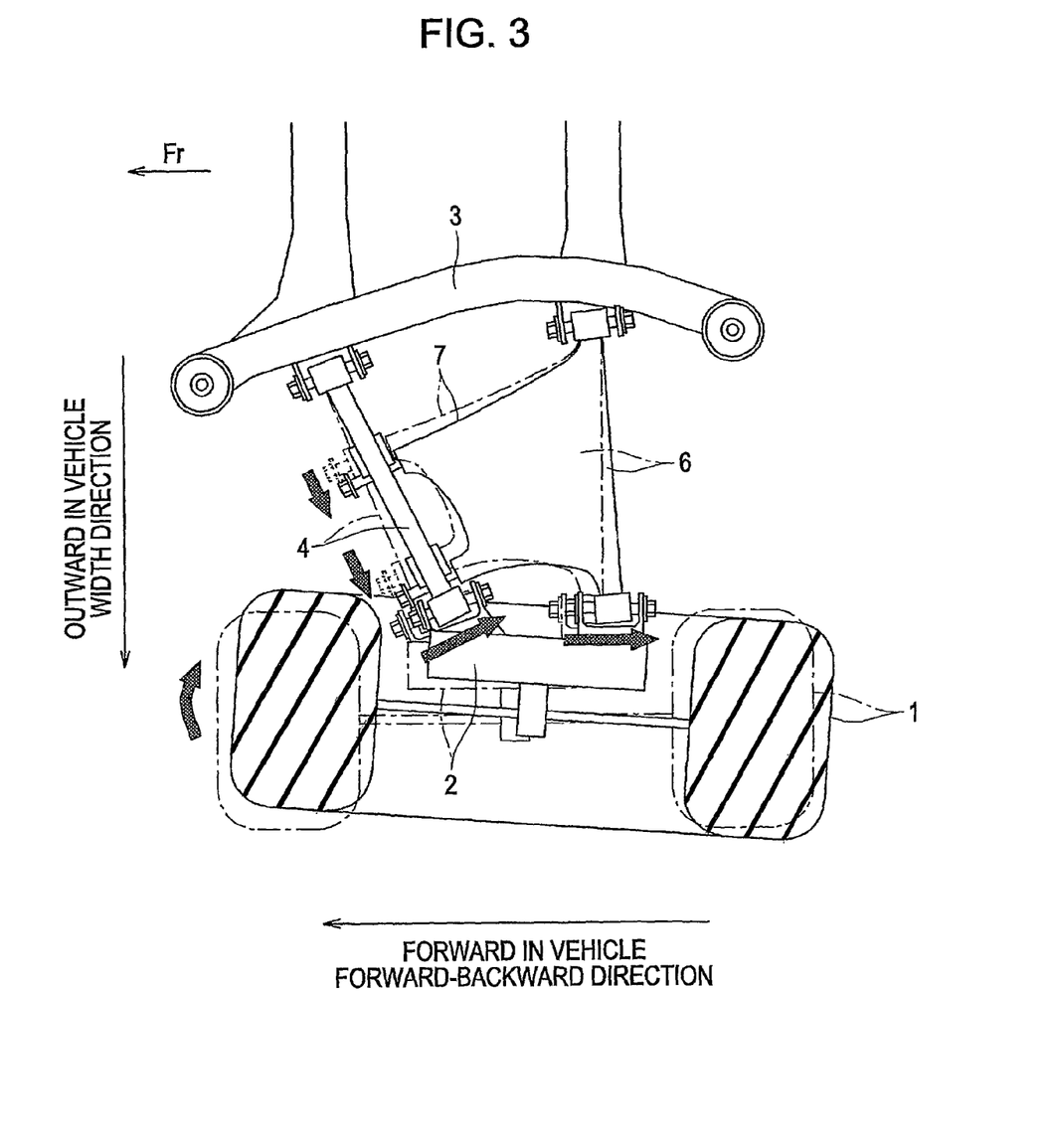
FIG. 3 is a top view of a behavior with respect to an input in a vehicle forward-backward direction.
Figure 3A:
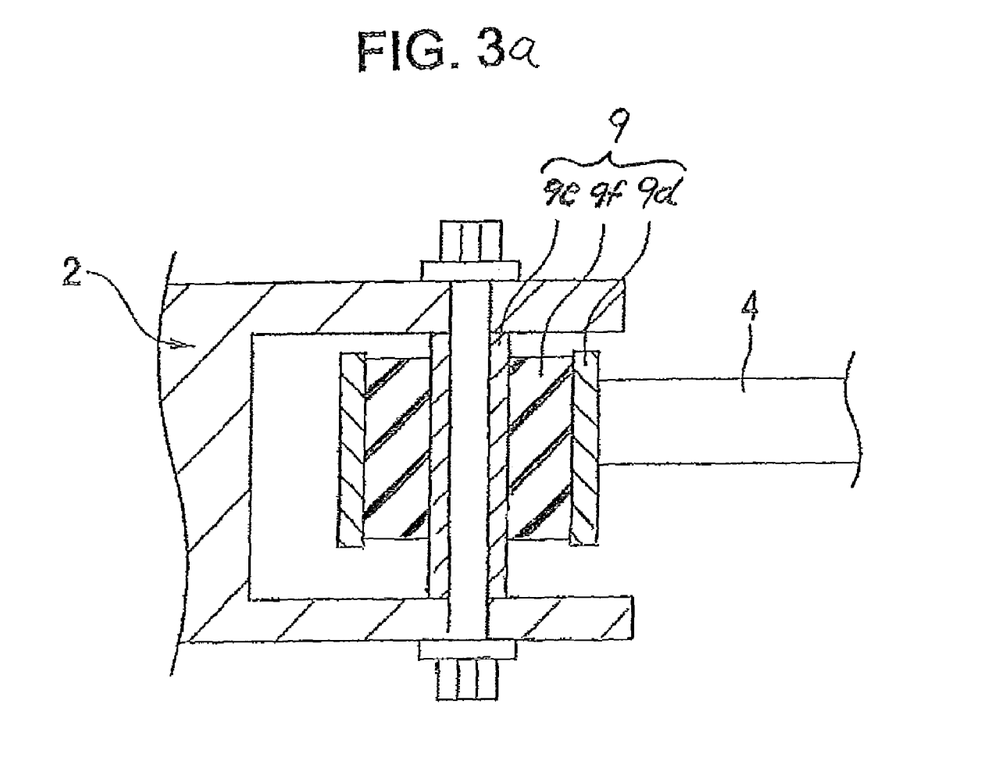
FIG. 3a is a cross-sectional view taken through bush 9 in FIG. 1.

Referring to FIGS. 1, 3 and 3*a* the bushes 9 to 14 comprise elastic members 9*f* formed of rubber that are inserted between outer cylinders 9*d* and respective inner cylinders 9*e* and disposed in a nesting state. In the embodiment, the outer cylinders 9*d* are secured to ends of the links 4, 5 and 8, (4 shown) and the inner cylinders are mounted to the suspension member 3 or the axle 2 through bolts.

The front lower link 4 is a rod member extending linearly along a link axial line L1, and the bushes 9 and 11 are provided at mounting portions at the respective ends of the front lower link 4.

The rear lower link 5 comprises a link body 6 and a projecting portion 7. The link body 6 extends along a link axial line L2. The projecting portion 7 is integrated to the link body 6 and projects toward the front in the vehicle forward-backward direction, from the link body 6 towards the front lower link 4. The projecting portion 7 is a plate member and has a substantially trapezoidal shape in the top view.

An end of the projecting portion 7 opposing the front lower link 4 in the vehicle forward-backward direction is linked to the front lower link 4 through two bushes 20 and 21 that are disposed in an offset manner in a vehicle width direction. In the embodiment, the bushes 20 and 21, which link the front lower link 4 and the projecting portion 7, are, in the top view, disposed with their axes being oriented in substantially the vehicle forward-backward direction. The outer cylinders are secured to the front lower link 4, and the inner cylinders are secured to the projecting portion 7 through mounting bolts. Accordingly, the front lower link 4 and the rear lower link 5 are linked to each other so as to be swingable three-dimensionally by the bushes 20 and 21. In addition, the swinging amounts thereof are restricted to certain amounts due to, for example, the span between the outer and inner cylinders and the rigidity of the elastic members.

In addition, in the top view the lower links 4 and 5 are disposed so that the span in the vehicle forward-backward direction between mounting points of the respective lower links 4 and 5 to the axle 2 (hereunder simply referred to as "wheel-side mounting points P2 and P4", respectively) is less than the span in the vehicle forward-backward direction between mounting points of the respective lower links 4 and 5 to the suspension member 3 (hereunder simply referred to as "vehicle-body side mounting points P1 and P3", respectively). That is, in top view, an intersection P5 of the axial line L1 (connecting the wheel-side mounting point P2 and the vehicle-body side mounting point P1 of the lower link 4) and the axial line L2 (connecting the wheel-side mounting point P4 and the vehicle-body side mounting point P3 of the lower link 5) is set outward of the axle 2 in the vehicle width direction and outward of the wheel-side mounting points P2 and P4 of the respective lower links 4 and 5 in the vehicle width direction. In the top view of this embodiment, an offset amount of the wheel-side mounting point P2 towards the back in the vehicle forward-backward direction with respect to the vehicle-body side mounting point P1 in the lower link 4 is larger than an offset amount (substantially zero in FIG. 1) of the wheel-side mounting point P4 towards the back in the vehicle forward-backward direction with respect to the vehicle-body side mounting point P3 in the rear lower link 5.

In addition, in the top view of this embodiment, the tilting of the link axial line L1 of the front lower link 4 towards the back in the vehicle forward-backward direction is larger than the tilting of the link axial line L2 of the rear lower link 5 towards the back in the vehicle forward-backward direction. Due to such a disposition, in the top view, the shape defined by connecting four points, that is, the wheel-side mounting points P2 and P4 and the vehicle-body side mounting points P1 and P3 of the respective lower links 4 and 5, is a substantially trapezoidal shape.

Accordingly, as a result of setting the offset amount of the wheel-side mounting point P2 of the front lower link 4 with respect to the vehicle-body side mounting point P1 of the front lower link 4 greater than the offset amount of the wheel-side mounting point P4 of the rear lower link 5 with respect to the vehicle-body side mounting point P3 of the rear lower link 5 towards the back in the vehicle forward-backward direction, the intersection P5 of the link axial lines L1 and L2 of the respective lower links 4 and 5 is, in the top view, disposed behind a center (wheel center W/C) of the wheel 1 in the vehicle front-backward direction.

In the embodiment, the bushes 20 and 21, which constitute the linking portions of the two lower links 4 and 5, are such that their axes are oriented substantially in the vehicle forward-backward direction as mentioned above. In addition, they are anisotropic so as to have a relatively high vertical rigidity and low rigidity in the vehicle width direction. For the elastic members, formed of rubber and interposed between the outer and inner cylinders of the bushes 20 and 21, intermediate plates (harder than the elastic members) are interposed above and below the inner cylinders to adjust the vertical rigidity to a high value, and hollows are formed on both sides of the inner cylinders to adjust the rigidity in the vehicle width direction to a low value.

The bushes 20 and 21 are also called connecting bushes 20 and 21. The bushes 9 to 12, which link the lower links 4 and 5 to the axle 2 and the suspension member 3, are also called mounting bushes 9 to 12.

Here, the axle 2 constitutes a wheel supporting member, the suspension member 3 constitutes a vehicle-body side member, and the connect bushes 20 and 21 constitute the linking portions.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

As a result, the elastic members of the connecting bushes 20 and 21 flex with respect to the input to the wheel 1 in the forward-backward direction (that is, input to the wheel center W/C in the forward-backward direction) when encountering an irregular road surface. Thus, as shown in FIG. 3, the inner cylinders are swung and displaced in the vehicle width direction while being swung relatively slightly in the vehicle forward-backward direction with respect to the outer cylinders. This causes the substantially trapezoidal shape in which the four points (that is, the wheel-side mounting points P2 and P4 and the vehicle-body side mounting points P1 and P3) are connected to be changed in the top view so that the rigidity in the vehicle forward-backward direction of the axle 2 supported at the two linked lower links 4 and 5 is set low.

Therefore, shock is reduced when moving over a protrusion, thereby increasing ride quality.

Further, by linking the projecting portion 7 of the rear lower link 5 to the front lower link 4 using the connecting bushes 20 and 21, the relative displacement between the front lower link 4 and the rear lower link 5 is increased at the connecting bushes 20 and 21.

Since the relative displacement between the front lower link 4 and the rear lower link 5 is increased at the connecting bushes 20 and 21, the deformation amounts of the elastic members of the connecting bushes 20 and 21 are large. As a result, the elastic members generate large reaction forces, thereby preventing the relative displacement between the front lower link 4 and the rear lower link 5 from becoming larger than is necessary. That is, the front lower link 4 and the rear lower link 5 are prevented from swinging more than necessary.

In addition, the connecting bushes 20 and 21 flex with respect to the input in the forward-backward direction to absorb the input, thereby resulting in attenuation due to the characteristics of the rubber making up the connecting bushes 20 and 21. Therefore, vibration with respect to the input in the forward-backward direction subsides properly. Further, even if the lower links 4 and 5 are designed so as to satisfy strength requirements, the rigidity in the forward-backward direction is determined by the rigidity of the connecting bushes 20 and 21, thereby allowing the degree of design freedom to be increased.

Since the rigidity with respect to the input in the forward-backward direction can be set low as a result of the connecting bushes 20 and 21 flexing with respect to the forward-backward direction input to the wheels 1, even if the two lower links 4 and 5 are connected to each other and are made to receive the forward-backward direction input to the wheel 1, shock resulting from an irregular road surface is reduced. Therefore, the rigidity of the mounting bushes 9 to 12 (defining the wheel-side mounting points P2 and P4 and the vehicle-body side mounting points P1 and P3) need not be set low. That is, the rigidity of the mounting bushes 9 to 12 of the lower links 4 and 5 can be set high. Therefore, by setting high the rigidity of the mounting bushes 9 to 12 of the lower links 4 and 5, horizontal rigidity (that is, rigidity in the vehicle width direction) of the axle 2 can be made high. In addition, this results in increasing the rigidity of a camber so that steering stability can be increased. Since the horizontal input to the wheel 1 is applied to the two lower links 4 and 5 in substantially the directions of the link axial lines L1 and L2, even if the rigidity of the connect bushes 20 and 21 is set low, the horizontal rigidity of the axle 2 is not set low. As a result, the rigidity in the forward-backward direction can be set low and the horizontal rigidity can be set high, so that the ride quality and the steering stability can be increased.

In the top view, since the intersection P5 of the link axial lines L1 and L2 of the respective two linked lower links 4 and 5 is set outward of the axle 2 in the vehicle width direction, that is, since in the vehicle forward-backward direction, the span between the wheel-side mounting points P2 and P4 is set narrower than the span between the vehicle-body side mounting points P1 and P3, several operational advantages are provided.

First, when an input in the backward direction in the vehicle forward-backward direction is made to the wheel 1, the wheel-side mounting points P2 and P4 of the respective two lower links 4 and 5 are both swung and displaced by substantially the same amount toward the back in the vehicle forward-backward direction. The difference between the displacements of the wheel-side mounting points P2 and P4 of the respective two lower links 4 and 5 in the horizontal direction of the vehicle causes a change in toe, so that stability is increased during braking.

In the embodiment shown in FIG. 1, the link axial line L2 at the rear lower link 5 runs substantially in the vehicle width direction. The link axial line L1 at the front lower link 4 is tilted toward the back in the vehicle forward-backward direction so that the wheel 1 side is set toward the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled towards the vehicle a different amount than the wheel-side mounting point P4 of the rear lower link 5, so that the toe of the wheel 1 changes.

Also, in the top view the intersection P5 of the link axial lines L1 and L2 of the respective two lower links 4 and 5 is positioned behind the center (wheel center W/C) of the wheel 1 in the vehicle forward-backward direction, so that the rotational center of the axle 2 is positioned behind the wheel center W/C. Therefore, with respect to an input to a tire when the vehicle is turning, a torque is created that pushes the turning outer wheel 1 toward the toe direction, so that the stability during the turning of the vehicle is increased.

Another advantage is that the rigidity of the connecting bushes 20 and 21, disposed in an offset manner from each other in the vehicle width direction, is anisotropic with the vertical rigidity being high and the rigidity in the vehicle width direction being low. Therefore, the following operational advantages are provided for the input to the wheels 1 in the vehicle forward-backward direction.

When a braking force in the vehicle forward-backward direction is input to a ground-contact face of each wheel 1 due to, for example, a braking operation, a moment in a wind-up direction is generated due to this input. This moment causes an upward force to act upon the rear lower link 5 linked to the axle 2, and a downward force to act upon the front lower link 4, so that vertical forces are also input to the connecting bushes 20 and 21. At this time, as described above, the vertical rigidity of the connect bushes 20 and 21 is set high so that, even if both of the lower links 4 and 5 are linked to each other through the elastic members (linking portions), it is possible to increase the rigidity in the wind-up direction.

In addition, disposing the two connecting bushes 20 and 21 in an offset manner in the vehicle width direction makes it possible to restrict unnecessary vertical relative displacement between the rear lower link 5 and the front lower link 4 to a small amount.

As a result of setting the rigidity of the axle 2 in the forward-backward translational direction to be low by setting the horizontal rigidity of the connecting bushes 20 and 21 in the vehicle width direction to be low as described above, it is possible to improve ride quality and increase stability during braking and to reduce vibration due to the operational effects of the two rigidity settings.

Although the upper link 8 comprises one rod link, it may comprise two or more rod links, or may be one having a different form, such as an A arm.

Although the link axial line L2 of the rear lower link 5 is disposed in the vehicle width direction, and the link axial line L1 of the front lower link 4 is tilted toward the back in the vehicle forward-backward direction to set the intersection P5 of the link axial lines L1 and L2 of the respective two lower links 4 and 5 outward of the axle 2 in the vehicle width direction, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point P4 is disposed further toward the front in the vehicle forward-backward direction than the vehicle-body side mounting point P3. By this, the intersection P5 of the link axial lines L1 and L2 of the respective two lower links 4 and 5 is set outward of the axle 2 in the vehicle width direction.

Although the axes of the connecting bushes 20 and 21 are disposed so as to be oriented substantially in the vehicle forward-backward direction, the invention is not limited thereto. The axes of the connecting bushes 20 and 21 may be disposed, for example, in the vehicle width direction or along the link axial lines L1 and L2. However, when the axes of the connecting bushes 20 and 21 are oriented vertically, it is difficult to make the connecting bushes 20 and 21 anisotropic bushes having high vertical rigidity.

Figure 4:
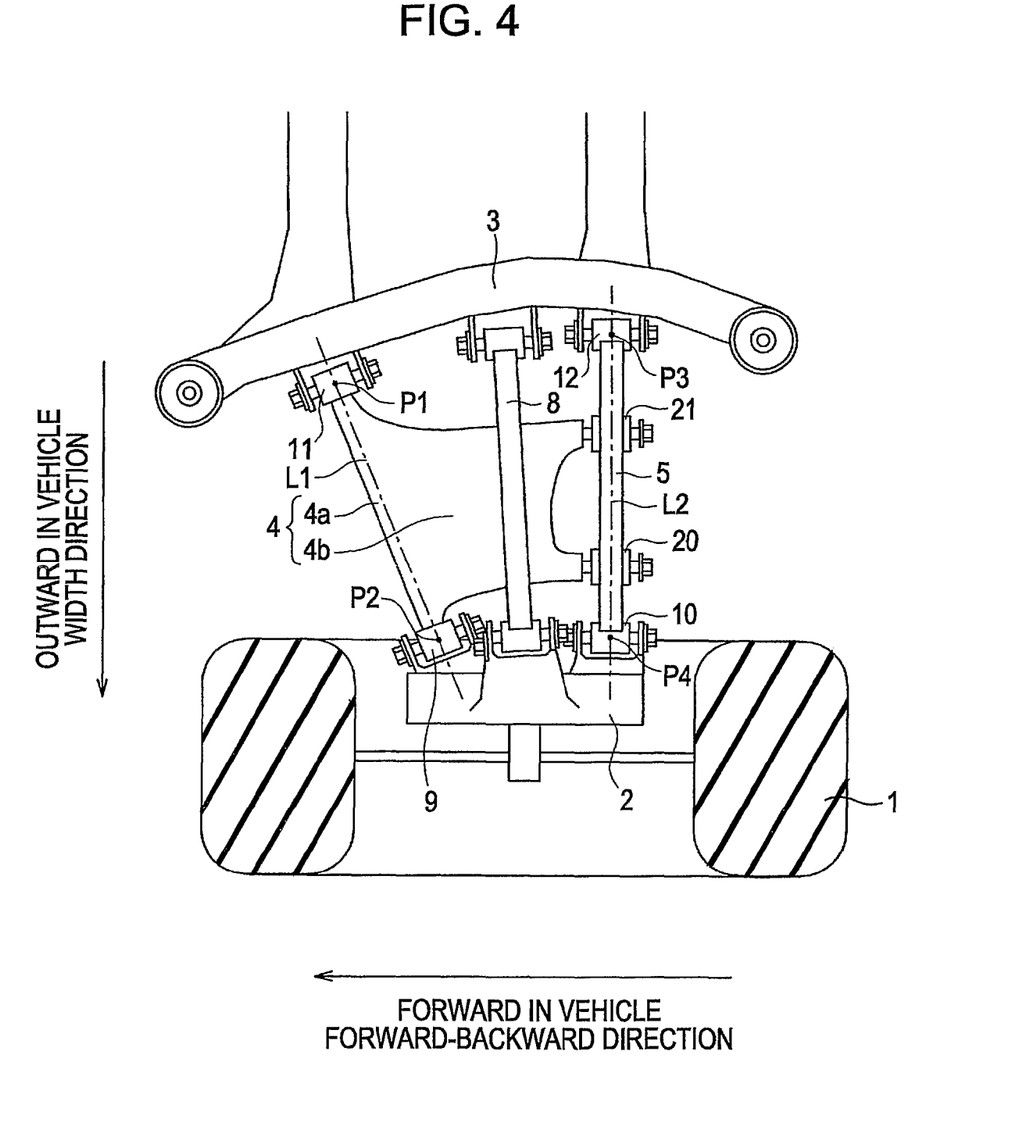
FIG. 4 is a top view of a different suspension device for rear wheels according to the first embodiment.

Although in the embodiment the projecting portion 7 projecting toward the front in the vehicle forward-backward direction is provided in the rear lower link 5 so that the linking portions of the lower links 4 and 5 are disposed on the link axial line L1 of the front lower link 4, the invention is not limited thereto. As shown in FIG. 4, it is possible to provide a projecting portion 7 projecting toward the back in the vehicle forward-backward direction and integral with the front lower link 4 and to dispose linking portions of the two lower links 4 and 5 on the link axial line L2 in the top view.

In addition, it is possible to project projecting portions 7 separately from the lower link 4 to the lower link 5 and from the lower link 5 to the lower link 4, set one linking portion each on the axial lines of the lower links 4 and 5, and dispose the connecting bushes 20 and 21 on these linking portions, respectively. Even in this case, as viewed from the front of the vehicle, it is desirable that the two linking portions be disposed apart from each other in the vehicle width direction.

Further, the linking portions of the two lower links 4 and 5 need not be disposed on the link axial lines L1 and L2 of the respective lower links 4 and 5. For example, they may be disposed at intermediate positions between the two lower links 4 and 5, such as the case when each link 4, 5 includes a projecting portion 7 and the two projecting portions 7 are linked by at least one elastic linking portion.

The number of bushes 20, 21 constituting the linking portions of the two lower links 4 and 5 is not limited to two, so that three or more bushes may be used.

Although in the embodiment the lower links 4 and 5 are exemplified as two links disposed substantially in parallel in the vehicle width direction, the two links may be other types of links, such as upper links.

Although the suspension device is exemplified as that for rear wheels, the suspension device to which the invention is applied may be a suspension device for front wheels.

A second embodiment is next described with reference to the drawings. Corresponding parts to those of the first embodiment are given the same reference numerals and are described below.

Figure 5:
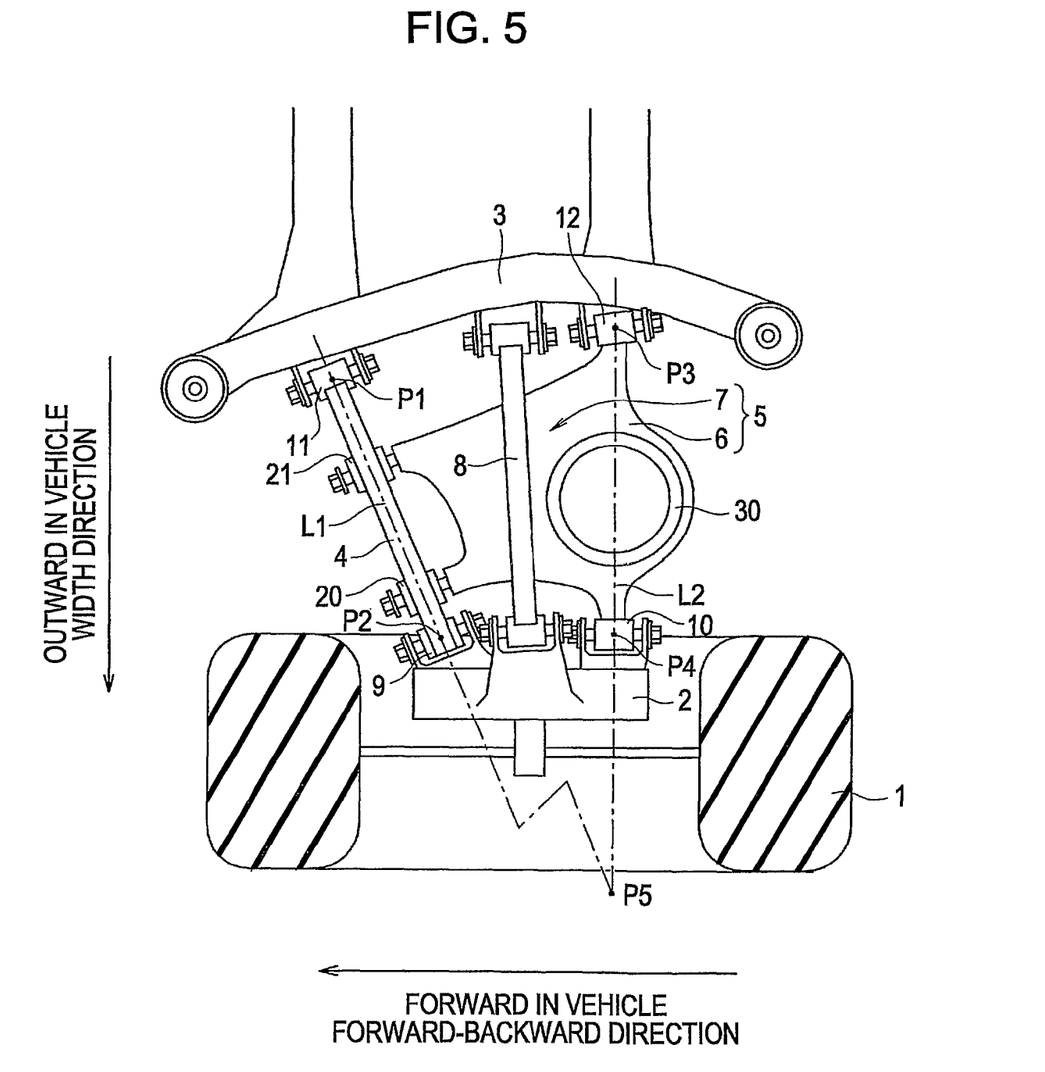
FIG. 5 is a top view of a suspension device for rear wheels according to a second embodiment of the invention.

The basic structure of the second embodiment is similar to that of the first embodiment. It differs in that a lower mounting portion 30 of a suspension spring is attached along a lower link 4 or 5.

In addition, as shown in FIG. 5, the lower mounting portion 30 of the suspension spring is set in the top view so as to overlap a link axial line L2 of the rear lower link 5. The center of the lower mounting portion 30 of the suspension spring is on the link axial line L2 of the rear lower link 5. The other structural features are similar to those of the first embodiment.

As a result of disposing the lower mounting position of the suspension spring as low as possible by disposing the lower portion of the suspension spring so as to be supported by the lower link 5, a structure that is advantageous from the viewpoint of, for example, enlarging a baggage compartment space in the vehicle is provided.

Since in the top view the lower mounting portion 30 of the suspension spring is positioned substantially on the link axial line L2 where supporting rigidity at both ends is high, reaction force of the suspension spring restricts the displacement of link mounting points to zero or to a small value. Therefore, the reaction force of the suspension spring can be efficiently transmitted.

Here, as described in the first embodiment, the structure is advantageous from the viewpoint that the rigidity of mounting bushes 9 to 12 provided at respective ends of the lower links 4 and 5 can be increased.

Further, even if a vertical reaction force from the suspension spring is input to the rear lower link 5, the reaction force is primarily received by the mounting bushes 9 to 12 provided at the respective ends of the lower links 4 and 5. Therefore, the reaction force of the suspension spring can reduce flexing of connecting bushes 20 and 21 to zero or to a small value.

Although the case in which the suspension spring is supported by the rear lower link 5 is shown by example, the suspension spring may be supported by the front lower link 4 to obtain similar advantages.

Although the suspension spring is given as an example of a suspension product that is supported by the lower link 4 or the lower link 5 and that inputs vertical reaction force to the lower link 4 or the lower link 5, in place of or along with the suspension spring the lower portion of a suspension damper may be mounted to the lower link 4 or the lower link 5. Even in this case, by disposing the suspension damper so as to be mounted to the link axial line L1 of the lower link 4 or the link axial line L2 of the lower link 5 in the top view, the previously-described operational advantages can be achieved.

Figure 6:
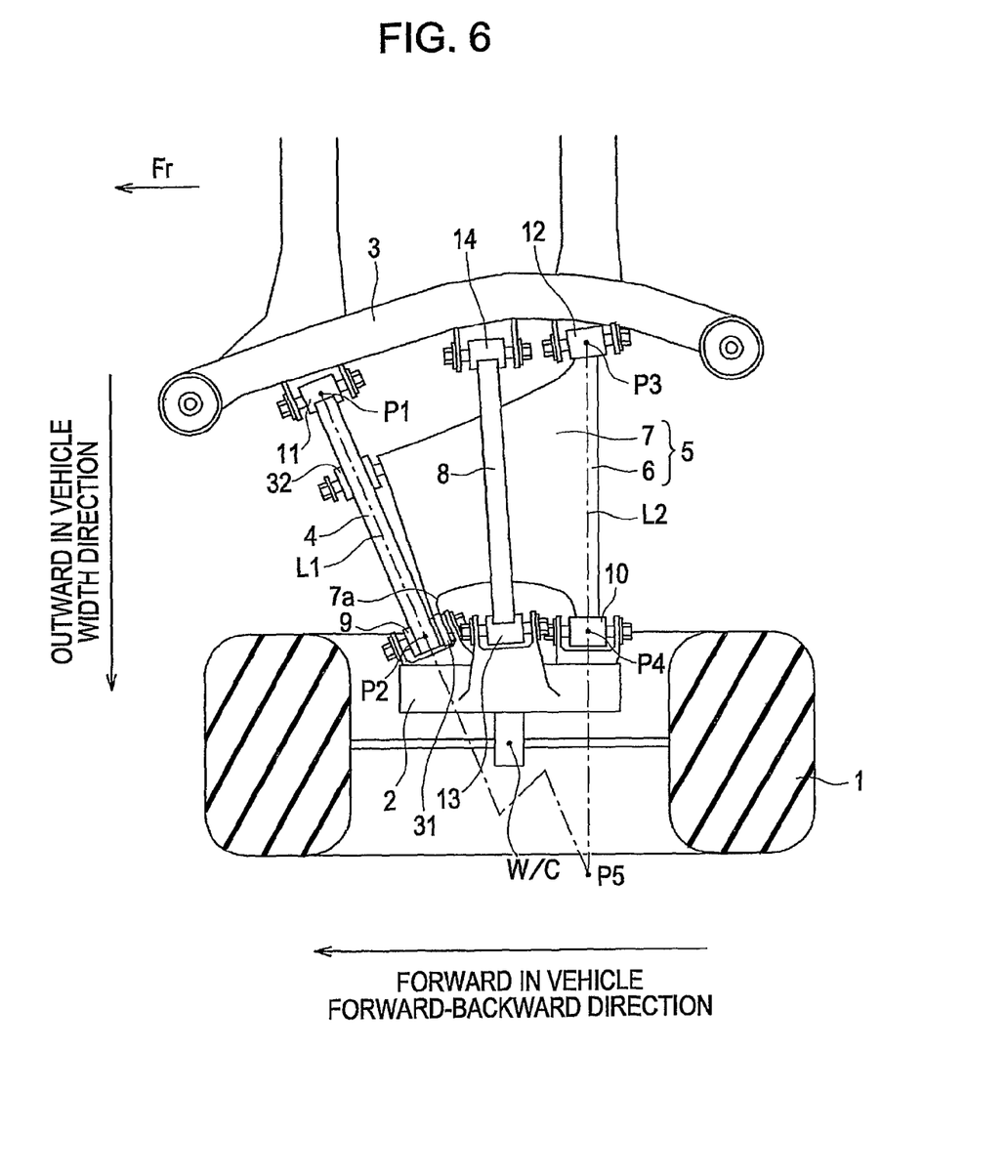
FIG. 6 is a top view of a suspension device for rear wheels according to another embodiment.

Other embodiments are next described with reference to FIGS. 6 and 7.

The suspension device comprises two lower links, that is, a lower link 4 and a lower link 5, and an upper link 8. The lower links 4 and 5 link a lower area of an axle 2, which rotatably supports a wheel 1, and a suspension member 3, which is a vehicle-body side member. The upper link 8 links an upper area of the axle 2 and the suspension member 3.

The two lower links 4 and 5 are mounted to the axle 2 by a bush 9 and a bush 10, respectively, so as to be swingable vertically. The two lower links 4 and 5 are linked to the suspension member 3 by a bush 11 and a bush 12, respectively, so as to be swingable vertically. The upper link 8 is mounted to the axle 2 by one bush 13 so as to be swingable vertically and is linked to the suspension member 3 by one bush 14 so as to be swingable vertically.

The two lower links 4 and 5 are disposed substantially in parallel in a vehicle width direction and are linked to each other so as to be mutually swingable only within a predetermined range. Here, when the two lower links 4 and 5 are to be distinguished in the description, the lower link 4 at the front side in the vehicle forward-backward direction is called the "front lower link 4," and the lower link 5 at the rear side in the vehicle forward-backward direction is called the "rear lower link 5."

The bushes 9 to 14 comprise elastic members, formed of rubber, that are inserted between outer cylinders and respective inner cylinders and disposed in a nesting state. In the embodiment, the outer cylinders are secured to ends of the links 4, 5 and 8, and the inner cylinders are mounted to the suspension member 3 or the axle 2 through bolts.

The front lower link 4 is a rod member extending linearly along a link axial line L1, and the bushes 9 and 11 having the above-described structure are provided at mounting portions at the respective ends of the front lower link 4.

The rear lower link 5 comprises a link body 6 and a projecting portion 7. The link body 6 extends along a link axial line L2. The projecting portion 7 is integrated with the link body 6 and projects toward the front in the vehicle forward-backward direction from the link body 6 towards the front lower link 4. The projecting portion 7 is, for example, a plate member, and has a substantially trapezoidal shape in top view.

An end of the projecting portion 7 opposing the front lower link 4 in the vehicle forward-backward direction is linked to the front lower link 4 through two bushes 31 and 32. The two bushes 31 and 32 are disposed in an offset manner in a vehicle width direction.

In the description below, the bushes 31 and 32 that connect the lower links 4 and 5 to each other are called "connecting bushes 31 and 32." The bushes 9 to 12 that connect the lower links 4 and 5 to the axle 2 and the suspension member 3 are called "mounting bushes 9 to 12."

When the two connecting bushes 31 and 32 are to be distinguished, the connecting bush 31 adjacent the wheels is called a "wheel-side connecting bush 31," and the connecting bush 32 at the vehicle-body side is called a "vehicle-body side connecting bush 32."

In the vehicle-body side connecting bush 32, an outer cylinder is secured to a portion of the front lower link 4 so that the axial direction of the outer cylinder is perpendicular to axial link line L1, and an inner cylinder is secured to the projecting portion 7 through a mounting bolt.

The wheel-side connecting bush 31 is linked to the front lower link 4 through the mounting bush 9, or bush 9, disposed at a wheel-side end of the front lower link 4. The wheel-side connecting bush 31 is linked to the front lower link 4 through the bush 9 by, for example, mounting the wheel-side connecting bush 31 and the bush 9 to the axle 2 by common fastening.

A structure for commonly fastening the wheel-side connecting bush 31 and the bush 9 to the axle 2 is now described.

As described above, the bush 9 is formed by interposing an elastic member, formed of rubber, between the outer cylinder and the inner cylinder and disposed in a nesting state. As shown in FIG. 7, in the bush 9 an outer cylinder 9*a* is secured to the wheel-side end of the front lower link 4, and an inner cylinder 9*b* is mounted at both sides to a C-shaped bracket 33 provided at the axle 2 using a bolt 34. That is, the C-shaped bracket 33 has two side walls 33*a* disposed in parallel and extending in a direction having a component in the vehicle forward-backward direction. The bush 9 is disposed between the two side walls 33*a*, and the mounting bolt 34 extending through the inner cylinder 9*b* is secured to the two side walls 33*a*. In FIG. 7, reference numeral 34*a* denotes a head of the bolt, and reference numeral 35 denotes a nut that is secured to the shaft of the bolt 34.

Here, the inner cylinder 9*b* of the bush 9 projects in a direction with a component towards the rear lower link 5 and also serves as the inner cylinder of the wheel-side connect bush 31.

A wheel-side front portion of the projecting portion 7 at the front side in the vehicle forward-backward direction (hereafter referred to as "projecting front end 7*a*") is disposed in the C-shaped bracket 33. By forming in the projecting front end 7*a* an annular hole that is concentric with the inner cylinder 9*b*, an outer cylindrical portion 31*a* of the wheel-side connect bush 31 is formed at the projecting front end 7*a*.

The diameter of the hole for the outer cylindrical portion 31*a* is set equal to or substantially equal to the inside diameter of the outer cylinder 9*a* of the bush 9. The diameter of the hole for the outer cylindrical portion 31*a* may be different from the inside diameter of the outer cylinder 9*a* of the bush 9. An end of the outer cylindrical portion 31*a* opposes the outer cylinder 9*a* of the bush 9 in a bush 9 axial direction (that is, in the vehicle forward-backward direction). In addition, a connect-side elastic member 31*c*, formed of rubber, is interposed between the outer cylindrical portion 31*a* and the inner cylinder 9*b*. The connect-side elastic member 31*c* is cylindrical, and its inside-diameter face has a form and diameter that allow the inner cylinder 9*b* to be press-fitted thereto. The connect-side elastic member 31*c* may also be slidably mounted to the inner cylinder 9*b*.

An annular recess 31*d* to which the outer cylindrical portion 31*a* can be fitted is formed in an outer-diameter face of the connect-side elastic member 31*c*. The outer cylindrical portion 31*a* is fitted to the recess 31*d* so that the connect-side elastic member 31*c* is relatively mounted to the projecting front end 7*a*, which corresponds to the outer cylindrical portion 31*a*. The axial length of the connect-side elastic member 31*c* is longer than that of the outer cylindrical portion 31*a*, and the bush 9 side of the elastic member 31*c* is provided with a projection 31*e* having a diameter that allows it to be press-fitted into the outer cylinder 9*a* of the bush 9.

Figure 8:
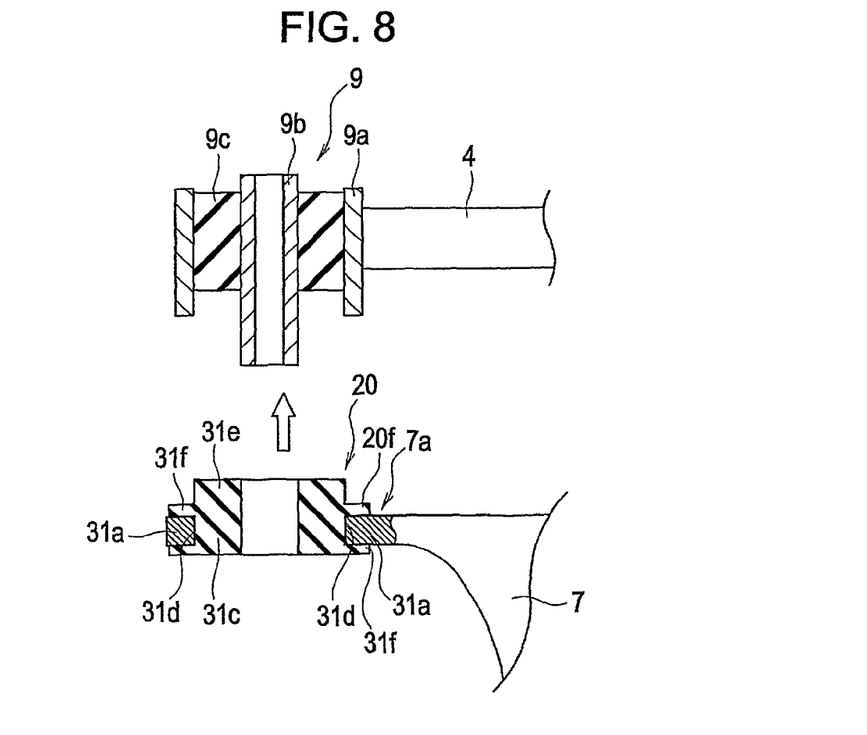
FIG. 8 is an exploded cross-sectional view of the mounting structure of the wheel-side connecting bush.

As shown in FIG. 8, the wheel-side connecting bush 31 is linked to the front lower link 4 through the bush 9 by press-fitting and mounting the protrusion 31*e* of the elastic member 31*c* to a portion between the outer cylinder 9*a* and the inner cylinder 9*b* of the bush 9.

Here, an elastic portion 31*f*, positioned on both sides of the outer cylindrical portion 31*a*, is interposed between the outer cylindrical portion 31*a* and the outer cylinder 9*a* of the bush 9.

Accordingly, the front lower link 4 and the rear lower link 5 are linked by the connecting bushes 31 and 32 so as to be swingable three-dimensionally. In addition, the swing amount is regulated to a certain value due to, for example, the rigidity of the elastic members or the span between the outer and inner cylinders of the connecting bushes 31 and 32. The rigidity of the connecting bushes 31 and 32 is set lower than the rigidity of the mounting bushes 9 to 12.

Here, the axle 2 constitutes a wheel supporting member, and the suspension member 3 constitutes a vehicle-body side member. The connecting bushes 31 and 32 constitute elastic linking portions. The rear lower link 5 constitutes a first link, and the front lower link 4 constitutes a second link. The outer cylindrical portion 31*a* constitutes the outer cylinder of the wheel-side connecting bush 31. The bush 9 constitutes a linking portion of the second link to the wheel-side supporting member.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

Further, by linking the projecting portion 7 of the rear lower link 5 to the front lower link 4 using the connecting bushes 31 and 32, the relative displacement between the front lower link 4 and the rear lower link 5 is increased at the connecting bushes 31 and 32. As a result, the elastic members (or linking portions) of the connecting bushes 31 and 32 flex with respect to the input to the wheels 1 in the forward-backward direction (input to the wheel center W/C in the forward-backward direction) from an irregular road surface. Accordingly, in the connecting bushes 31 and 32, the inner cylinders are swung and displaced in the vehicle width direction while being swung relatively slightly in the vehicle forward-backward direction with respect to the outer cylinders.

This causes the substantially trapezoidal shape in which the four points (that is, the wheel-side mounting points P2 and P4 and the vehicle-body side mounting points P1 and P3) are connected to be changed in the top view so that the rigidity in the vehicle forward-backward direction of the axle 2 supported at the two linked lower links 4 and 5 is set low. Therefore, shock is reduced when moving over a protrusion, thereby increasing ride quality.

Since the relative displacement between the front lower link 4 and the rear lower link 5 is increased at the connecting bushes 31 and 32, the deformation amounts of the elastic members of the connecting bushes 31 and 32 are large. As a result, the elastic members generate large reaction forces, thereby preventing the relative displacement between the front lower link 4 and the rear lower link 5 from becoming larger than is necessary. That is, the front lower link 4 and the rear lower link 5 are prevented from swinging more than necessary.

In addition, the connecting bushes 31 and 32 flex with respect to the input in the forward-backward direction to absorb the input, thereby resulting in attenuation due to the characteristics of the rubber making up the connecting bushes 31 and 32. Therefore, vibration with respect to the input in the forward-backward direction subsides properly. Further, even if the lower links 4 and 5 are designed for strength, the rigidity in the forward-backward direction is determined by the rigidity of the connecting bushes 31 and 32. The degree of design freedom can thus be increased.

Next, since the rigidity with respect to the input in the forward-backward direction can be set low as a result of the connecting bushes 31 and 32 flexing with respect to the forward-backward direction input to the wheels 1, even if the two lower links 4 and 5 are connected to each other and are made to receive the forward-backward direction input to the wheels 1, shock resulting from an irregular road surface is reduced. Therefore, the rigidity of the mounting bushes 9 to 12 (defining the wheel-side mounting points P2 and P4 and the vehicle-body side mounting points P1 and P3) need not be set low. That is, the rigidity of the mounting bushes 9 to 12 of the lower links 4 and 5 can be set high. Therefore, by setting high the rigidity of these mounting bushes 9 to 12, horizontal rigidity (that is, rigidity in the vehicle width direction) of the axle 2 can be made high. In addition, this results in increasing the rigidity of a camber so that steering stability can be increased. Since the horizontal input to the wheels 1 is applied to the two lower links 4 and 5 in substantially the directions of the link axial lines L1 and L2, even if the rigidity of the connecting bushes 31 and 32 is set low, the horizontal rigidity of the axle 2 is not set low. As a result, the rigidity in the forward-backward direction can be set low and the horizontal rigidity can be set high, so that the ride quality and the steering stability can be increased.

When a braking force in the vehicle forward-backward direction is input to a ground-contact face of each wheel 1 due to, for example, a braking operation, a moment in a wind-up direction is generated due to this input. This moment causes an upward force to act upon the rear lower link 5 linked to the axle 2 and a downward force to act upon the front lower link 4, so that vertical forces are also input to the connecting bush 31 and 32 (linking portions of both the lower links 4 and 5).

If the vertical rigidity of the connecting bushes 31 and 32, disposed apart from each other in the vehicle width direction, is set high with respect to such a vehicle forward-backward direction input to the wheels 1, even if the two lower links 4 and 5 are linked to each other through elastic members, it is possible to increase a wind-up direction rigidity.

In contrast, if the vertical rigidity of the connecting bushes 31 and 32 is set low, when a wind-up direction input is applied to the two lower links 4 and 5, the connecting bushings 31 and 32 absorb vibrational energy as a result of being positively and repeatedly flexed and deformed. Therefore, vibration that is transmitted to the vehicle body from the suspension can also be reduced.

In this embodiment, among two points swingably linking the two lower links 4 and 5 (setting positions of the connect bushes), the wheel-side linking point (wheel-side connecting bush 31) is commonly fastened along with the bush 9 constituting the linking point of the front lower link 4 to the axle 2.

Figure 7:
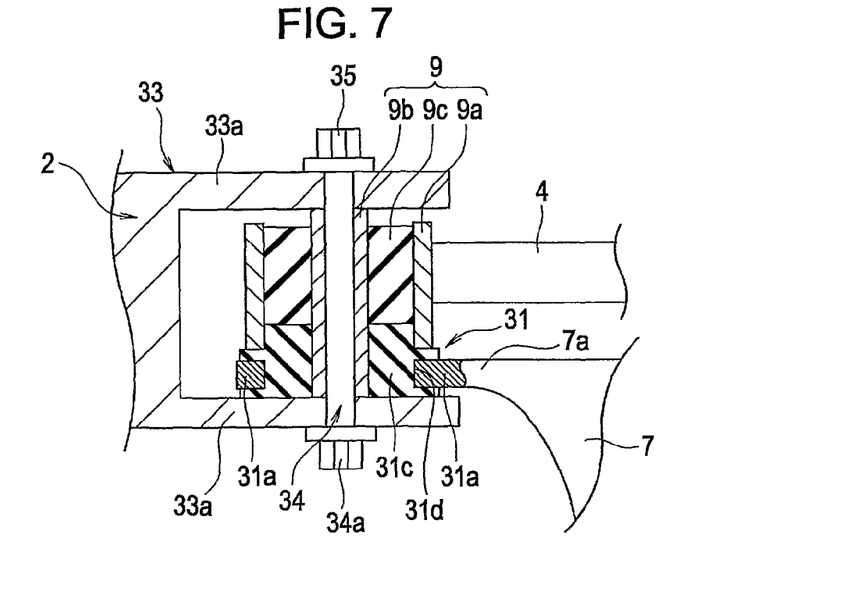
FIG. 7 is a cross-sectional view showing a mounting structure of a wheel-side connecting bush.

Therefore, the vehicle-body side connecting bush 32 tends to have a cantilever supporting mounting structure, the more one considers reducing the number of parts, whereas the wheel-side connecting bush 31 has a mounting structure in which both sides of the bolt 34 are supported by the axle 2 through the bracket 30 (see FIG. 7). Consequently, compared to the structure in which the projecting portion 7 and the front lower link 4 are connected to each other through the vehicle-body side connecting bush 32, the linking structure using the wheel-side connecting bush 31 makes it easier to reduce weight.

By virtue of a common fastening structure, for example, a bolt 34 is also shared by the bush 9, so that the number of parts is reduced. As a result, it is possible to reduce the weight and the number of parts of the vehicle.

Even in the structure in which the wheel-side connecting bush 31 and the bush 9 are commonly fastened is used, since the elastic portion 31f is disposed between the outer cylindrical portion 31a of the wheel-side connecting bush 31 and the outer cylinder 9a of the bush 9, the projecting front end 7a can reliably swing with respect to the front lower link 4. As a result, it is possible to realize a low suspension forward-backward rigidity such as that mentioned above.

In an embodiment, as in FIG. 7, when an elastic portion 31c is interposed between the side walls 33a and the outer cylindrical portion 31a, the projecting front end 7a is even more swingable.

When the two lower links 4 and 5 are elastically linked at only one linking point, the two lower links 4 and 5 may be relatively displaced from each other, such as twisting by a large amount relative to each other. In the embodiment, the two lower links 4 and 5 are elastically linked to each other at two points that are offset in the vehicle width direction so that, even though the two lower links 4 and 5 are elastically linked to each other, it is possible to restrict relative variations between the two lower links 4 and 5 to a predetermined range. It is also possible to reduce load at each linking point.

In particular, the wheel-side linking point is positioned at the wheel-side end of the front lower link 4 or the vicinity thereof, so that a large gap can be provided between the two connecting bushes 31 and 32. Therefore, it is possible to reduce load on each of the connecting bushes 31 and 32 with respect to relative displacement in a twisting direction by a corresponding amount.

Figure 9:
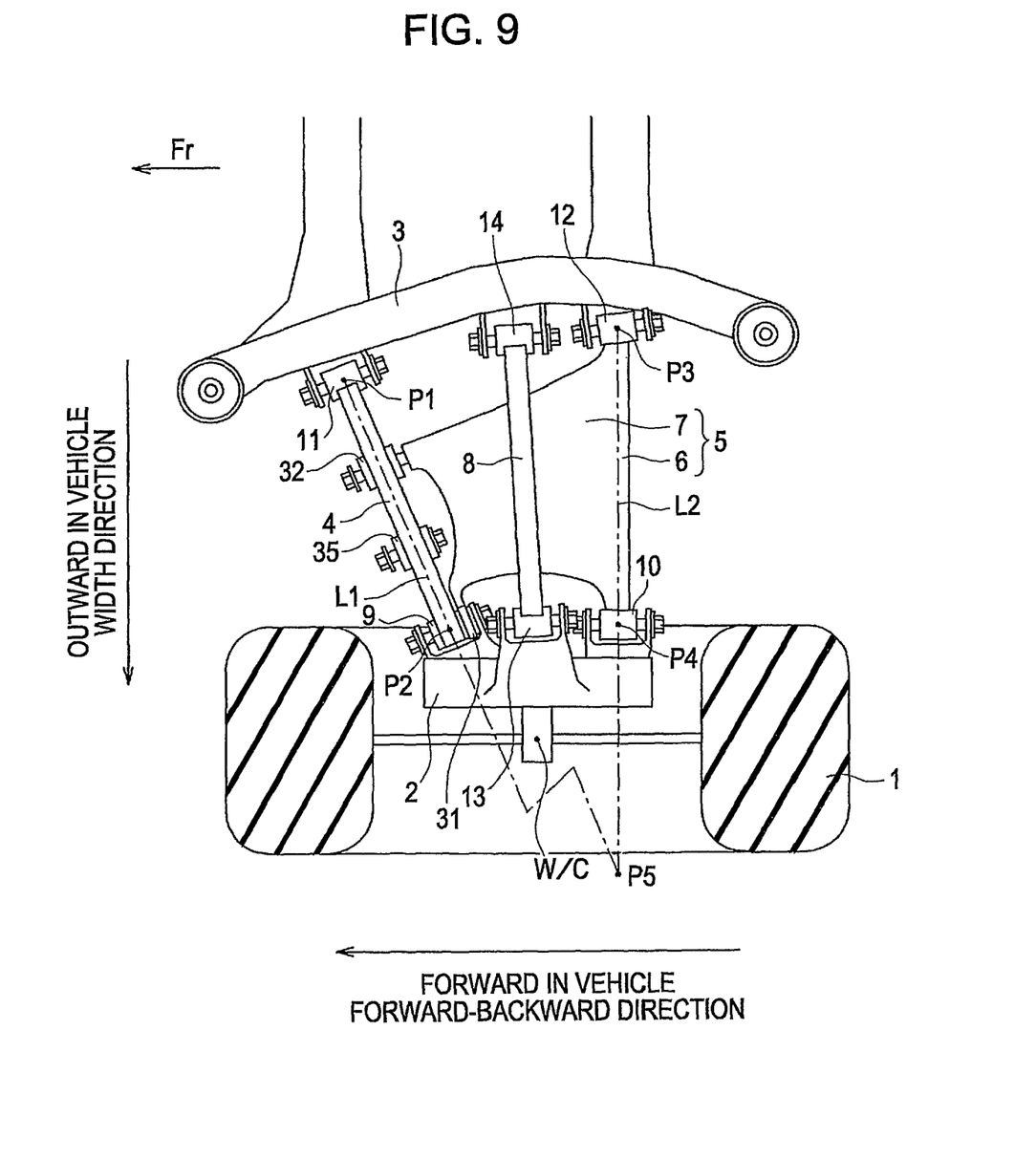
FIG. 9 is a top view illustrating a mounting position of, for example, a damper.

As shown in FIG. 9, the lower portion of at least one of the damper and the suspension spring (not shown) having its axis oriented vertically is mounted to the front lower link 4. In the top view, the lower portion is disposed so as to overlap the link axial line L1 of the front lower link 4. In FIG. 9, reference numeral 35 denotes an exemplary bush for mounting the lower portion of at least one of the suspension spring and the damper to the front lower link 4.

In general, to provide a wide baggage compartment, it is effective to dispose the mounting point of the lower portion of the damper or the suspension spring not on the axle 2, but on the lower link 4, which is provided at a lower height.

Since as mentioned above the interval between the two connecting bushes 31 and 32 is large, the degree of freedom with which the suspension spring or the damper is disposed with respect to the front lower link 4 is increased in a limited link length. In addition, it is possible to provide a baggage compartment of a predetermined size by disposing the mounting point of the lower portion of the damper or the suspension spring at the front lower link 4.

In addition, here the reaction force from the suspension spring or the damper is input to the lower link 4 and is not input or is input by a small amount to the two connecting bushes 31 and 32. As a result, the elastic members of the connecting bushes 31 and 32 may have low rigidity.

When, for example, a damper is disposed at the rear lower link 5 including the projecting portion 7, depending upon the position of the damper, a reaction force acting in a direction that causes the rear lower link 5 to rotate as viewed from the vehicle width direction may act due to, for example, the damper. Therefore, the input to the two connecting bushes 31 and 32 may be increased.

Although the inner cylinder 9b of the bush 9 also serves as the wheel-side connecting bush 31 in this embodiment, the inner cylinder of the bush 9 and the inner cylinder of the wheel-side connecting bush 31 may be separate members. Regardless of whether or not an integrated inner cylinder or separate inner cylinders are used, when the bolt 34 is passed through the inner cylinders, the inner cylinder of the bush 9 and the inner cylinder of the wheel-side connecting bush 31 are coaxially disposed.

Although the elastic member 31c of the wheel-side connecting bush 31 is in contact with one of the sidewalls 33a as in FIG. 7, it is possible to increase the length of the inner cylinder 9b toward the back in the vehicle forward-backward direction, and, in a no-load state, bring the elastic member 31c of the wheel-side connecting bush 31 out of contact with the one of the sidewalls 33a, to further reduce the rigidity of the wheel-side connect bush 31.

In the embodiment, the elastic member 31c of the wheel-side connecting bush 31 is directly in contact with the elastic member 9c of the bush 9. However, an annular third elastic member may be disposed between at least the outer cylindrical portion 31a of the wheel-side connecting bush 31 and the outer cylinder 9a of the bush 9, in a portion between the wheel-side connect bush 31 and the bush 9.

Figure 10:
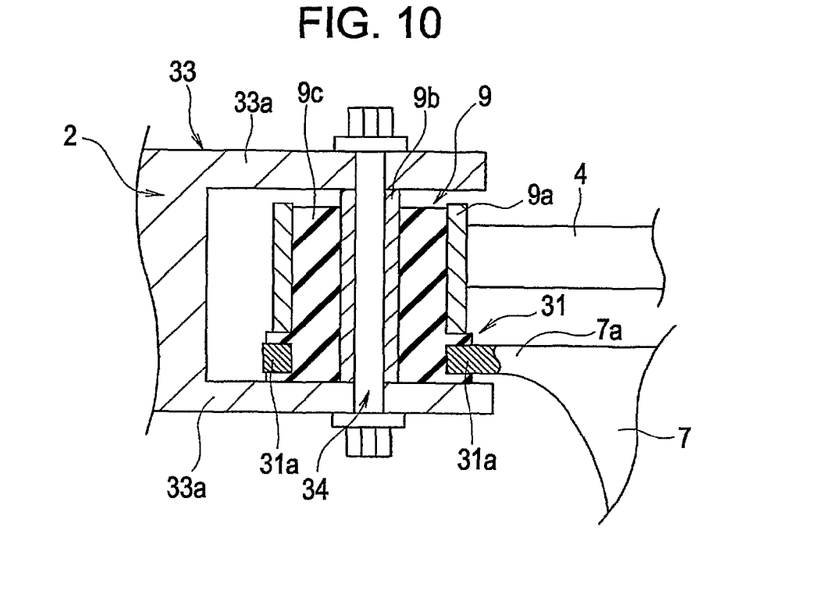
FIG. 10 is a cross-sectional view of a different mounting structure of the wheel-side connecting bush.
Figure 11:
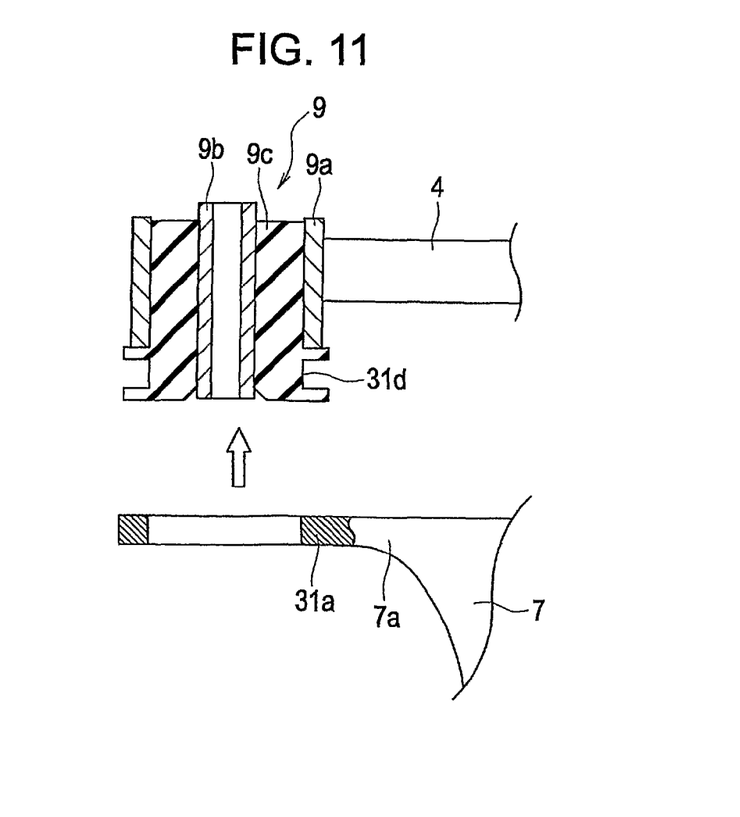
FIG. 11 is an exploded cross-sectional view of the different mounting structure of the wheel-side connecting bush.

FIGS. 10 and 11 show another exemplary structure in which the bush 9 and the wheel-side connecting bush 31 are connected to each other by common fastening. In this exemplary structure, an elastic member 9c of a bush 9 extends toward the back in the vehicle forward-backward direction, and the elastic member of the bush 9 and an elastic member of a wheel-side connect bush 31 are integrated to each other.

That is, as shown in FIG. 11, a fitting annular recess 31d for fitting an outer cylindrical portion 31a thereto is formed in the extended portion of the elastic member 9c, and the outer cylindrical portion 31a is fitted and mounted to the recess 31d.

Even in such a structure, operational advantages similar to those provided by the above-described structure can be provided. In addition, one elastic member 9c is used so that the number of parts is reduced.

Although the upper link 8 comprises one rod link in the illustrated embodiments, the upper link 8 may comprise two or more rod links or may be one link having a different form, such as an A arm.

In the above-described embodiment, the axis of the vehicle-body side connecting bush 32 is disposed so as to be oriented substantially in the vehicle forward-backward direction, but the invention is not limited thereto. The axis of the connecting bush 32 may be disposed, for example, in the vehicle width direction or along the link axial line L1.

Further, the projecting portion 7 projecting toward the front in the vehicle forward-backward direction is provided at the rear lower link 5 to dispose the linking portions of the two lower links 4 and 5 at the front lower link 4. However, the invention is not limited thereto. It is possible to provide a projecting portion 7 that projects toward the back in the vehicle forward-backward direction from the front lower link 4 to dispose the linking portions of the two lower links 4 and 5 at the rear lower link 5 in the top view. Even in this case, the wheel side connecting bush 31 may be commonly fastened along with the bushing 10, which is a linking portion of the rear lower link 5 to the axle 2.

The number of connecting bushes 31, 32 constituting the linking portions of the two lower links 4 and 5 is not limited to two, so that three or more bushes may be used.

Although the lower links 4 and 5 are exemplified as two links disposed substantially in parallel in the vehicle width direction, the two links 4 and 5 may be other types of links, such as upper links.

Finally, although the suspension device is exemplified as one for rear wheels 1, the suspension device to which the invention of the application is applied may be a suspension device for front wheels.

While the invention has been described in connection with what are presently considered to be the most practical and preferred embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A suspension device for a vehicle comprising:
   a wheel supporting member configured to rotatably support a wheel;
   a first link having a projecting portion, the first link connecting the wheel supporting member to a vehicle-body side member;
   a second link extending outward from the vehicle-body side and connecting the wheel supporting member to the vehicle-body side; and
   at least two elastic connecting bushes positioned substantially along a second axial link line, each connecting bush directly and hingedly connecting the projecting portion to the second link separate and independent of the wheel supporting member.

2. The suspension device according to claim 1 wherein the at least two elastic connecting bushes includes a plurality of elastic connecting bushes spaced apart from each other substantially along the second axial link line.

3. The suspension device according to claim 2, further comprising:
   at least one of a suspension spring and a damper mounted to one of the first and second links.

4. The suspension device according to claim 1 wherein the at least one elastic linking portion includes a plurality of elastic linking portions linking the first and second links, at least one of which also connects the first and second links to the wheel supporting member.

5. The suspension device according to claim 4 wherein the elastic linking portion that connects the first and second links to the wheel supporting member includes a first elastic member disposed between an inner cylinder and an outer cylinder; and wherein the projecting portion includes a second elastic member abutting the first elastic member.

6. The suspension device according to claim 5 wherein the second elastic member is mounted on an aperture on the projecting portion.

7. The suspension device according to claim 1 further comprising a mounting bush at a wheel-side of at least one of the first or second links, wherein the mounting bush further includes a bolt passing through the bush and a nut coupled to the bolt.

8. The suspension device according to claim 7 wherein the mounting bush comprises an inner cylinder, an outer cylinder and an elastic member interposed between the inner cylinder and the outer cylinder, the elastic member is substantially continuous and substantially fills the radial distance between the inner cylinder and the outer cylinder between opposed transverse ends of the elastic member.

9. The suspension device according to claim 1 wherein the first link is connected to the wheel supporting member at a first mounting point and the vehicle-body side member at a second mounting point; wherein the second link is connected to the wheel supporting member at a third mounting point and the vehicle-body side member at a fourth mounting point; and wherein the first link and the second link are arranged such that a first axial link line extending through the first and second mounting points and a second axial link line extending through the third and fourth mounting points intersect at a position further outward in a vehicle width direction than a longitudinal centerline of the supported wheel.

10. The suspension device according to claim 9 wherein the second axial link line is at an angle to the vehicle width direction and first axial link line is aligned in the vehicle width direction.

11. The suspension device according to claim 9 wherein the first axial link line is at angle to the vehicle width direction and the second axial link line is aligned in the vehicle width direction.

12. The suspension device according to claim 1 wherein the wheel support member includes a wheel mounting axis; wherein the first link is connected to the wheel supporting member at a first mounting point and the vehicle-body side member at a second mounting point; wherein the second link is connected to the wheel supporting member at a third mounting point and the vehicle-body side member at a fourth mounting point; and wherein the first link and the second link are arranged such that a first axial link line extending through the first and second mounting points and a second axial link line extending through the third and fourth mounting points intersect at a position further backward in a vehicle forward-backward direction than the wheel mounting axis.

13. The suspension device according to claim 1 wherein the first link is connected to the wheel supporting member at a first mounting point and the vehicle-body side member at a second mounting point; wherein the second link is connected to the wheel supporting member at a third mounting point and the vehicle-body side member at a fourth mounting point; and wherein the suspension device further comprises at least one of a suspension spring and a damper mounted to one of the first link and the second link along an axial link line passing through the mounting points of the link.

14. The suspension device according to claim 1 wherein the projecting portion of the first link is a first projecting portion, the second link includes a second projecting portion and the at least one elastic connecting bush links the first projecting portion to the second projecting portion.

15. The suspension device according to claim 1 wherein the projecting portion is a plate member extending between a first elastic mounting bush connecting it to the wheel supporting member, a second elastic mounting bush connecting it to the vehicle-body side member and the at least two elastic connecting bushes connecting the projection portion to the second link.

16. The suspension device according to claim 15 wherein the first elastic mounting bush and the second elastic mounting bush are disposed with their axes being oriented in substantially a vehicle forward-backward direction; and wherein the at least one elastic connecting bush comprises a first connecting bush spaced apart from a second connecting bush, each of the first and second connecting bushes disposed substantially along a second axial link line with their axes oriented in substantially the vehicle forward-backward direction.

17. The suspension device according to claim 1 wherein the second link is arranged substantially parallel to the first link in a vehicle width direction.

18. A suspension device for suspending a wheel supporting member that rotatably supports a wheel, the suspension device comprising:
    first linking means for linking the wheel supporting member and a vehicle-body side member to each other;
    second linking means disposed behind the first linking means in a vehicle forward-backward direction, and linking the wheel supporting member and the vehicle-body side member to each other; and
    at least two elastic linking means for elastically linking the first linking means and the second linking means directly to each other along a second axial link line separate and independent of the wheel supporting member, and for permitting the first linking means and second linking means to be relatively displaced.

19. A method of suspending a wheel supporting member that rotatably supports a wheel, the method comprising:
    displacing a first link and a second link relative to each other in accordance with a displacement of the wheel supporting member in the vehicle forward-backward direction, the first and the second links extending outward in a vehicle width direction and linking the wheel supporting member with a vehicle-body side member, and the first link having a projection portion and being directly, elastically and hingedly connected to the second link substantially along a second axial link line in at least two places separate and independent of the wheel supporting member; and
    generating a reactionary elastic force in accordance with the relative displacement.

20. The suspending method according to claim 19, further comprising:
    applying a reaction force generated by at least one of a suspension spring and a damper to a link axial line extending between a first mounting point where at least one of the links is mounted to the wheel supporting member and a second mounting point where the link is mounted to the vehicle-body side member.

* * * * *